Dec. 6, 1960 H. W. JONES ET AL 2,963,185
TRANSPORTING EQUIPMENT
Filed Feb. 2, 1956 4 Sheets-Sheet 1
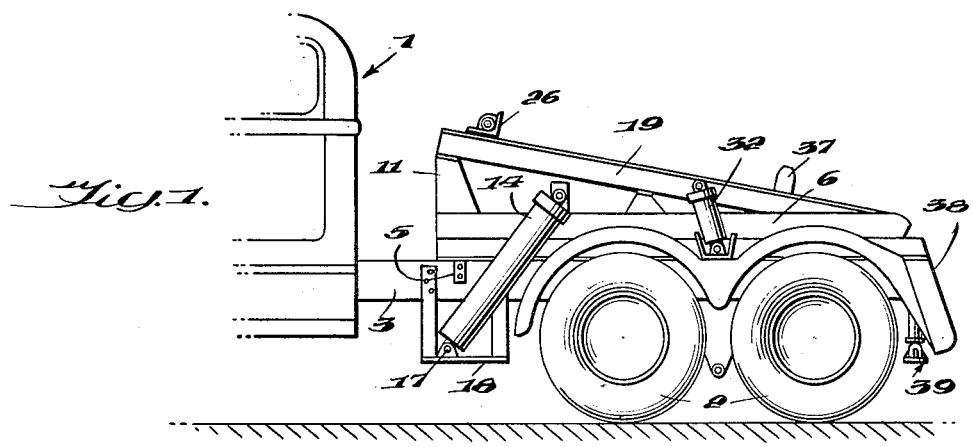
Fig. 1.
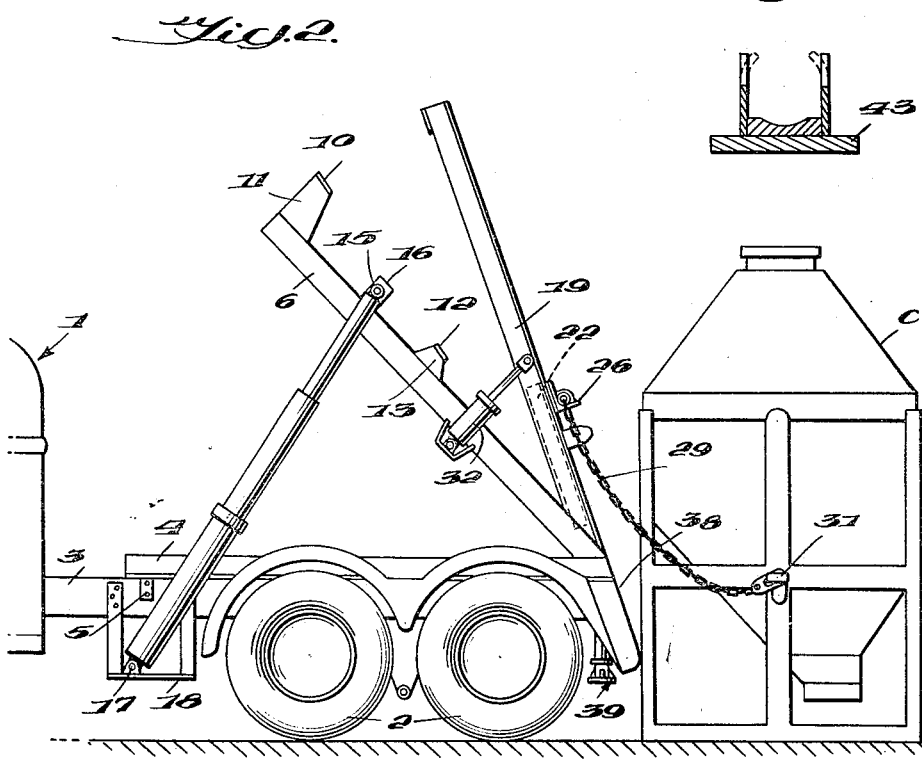
Fig. 2.
Fig. 12.
INVENTORS
HARRY W. JONES,
GEORGE R. DEMPSTER,
BY
ATTORNEYS

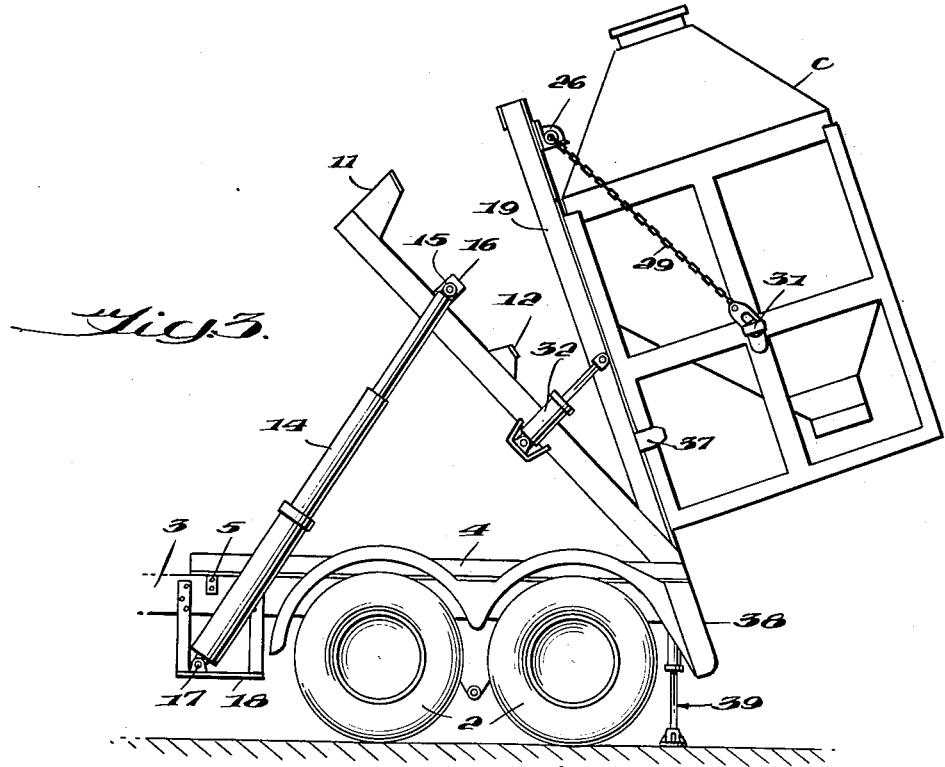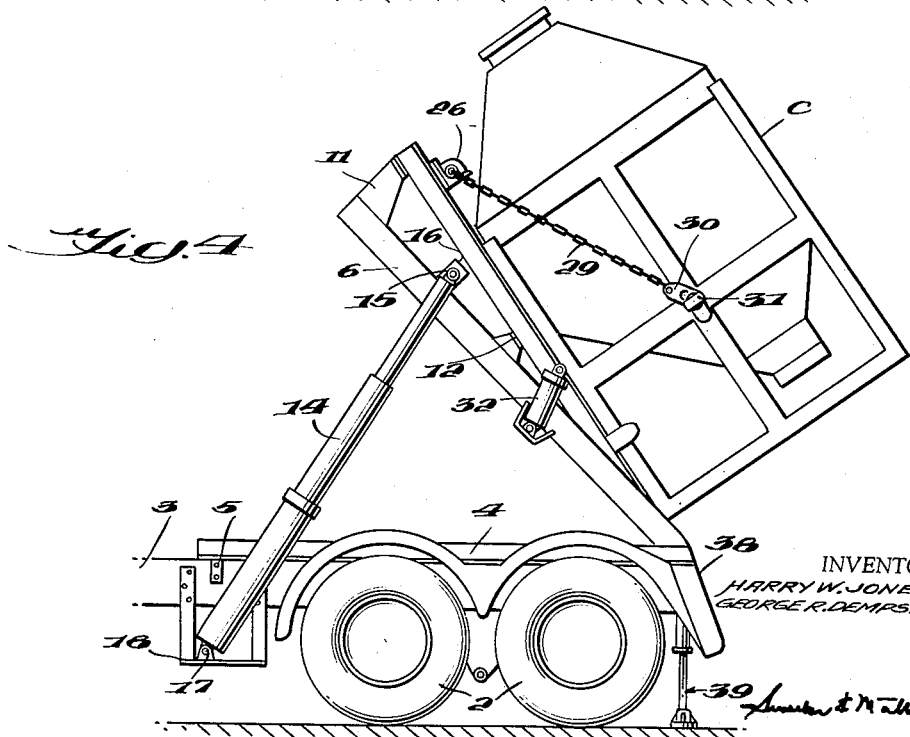

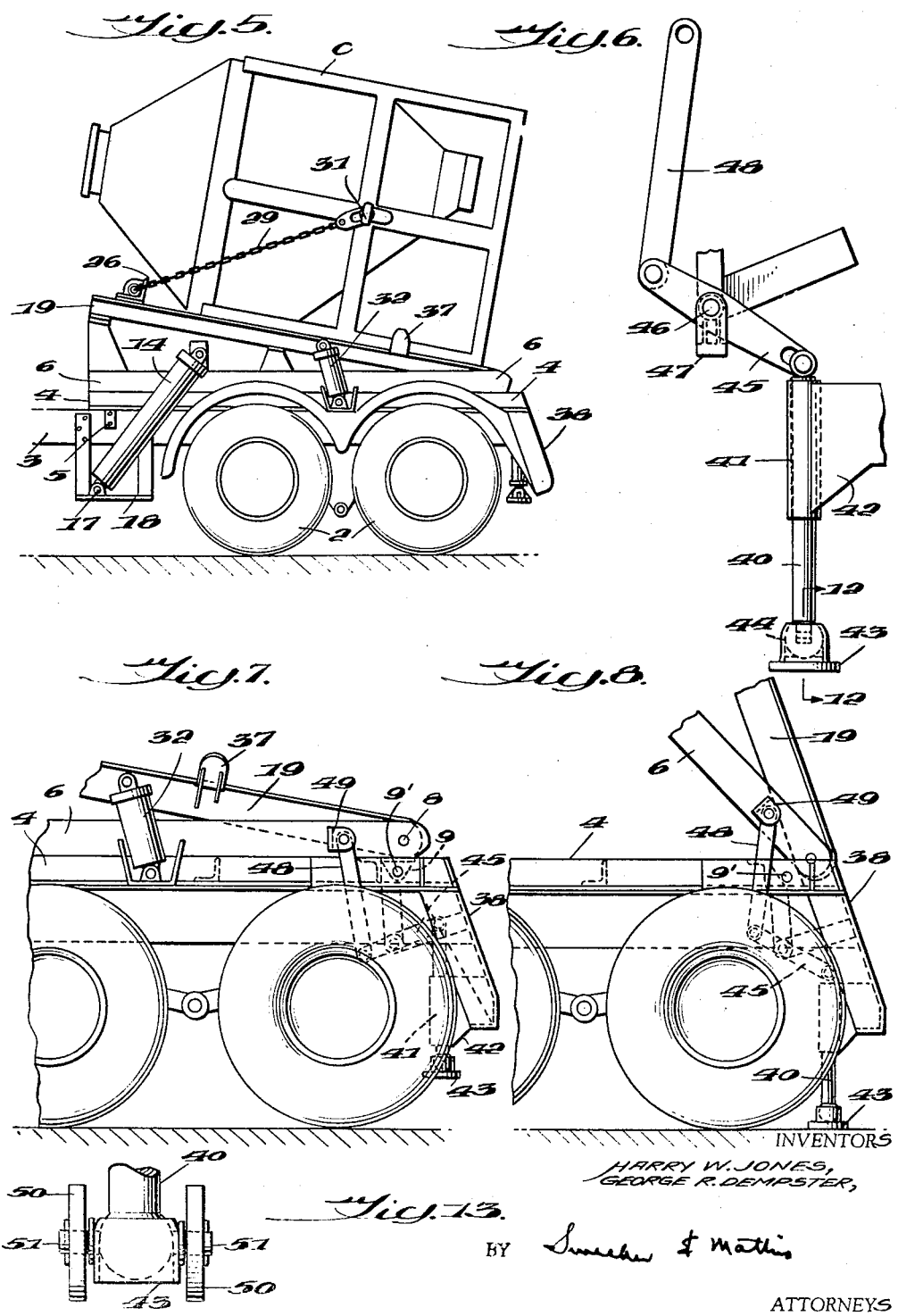

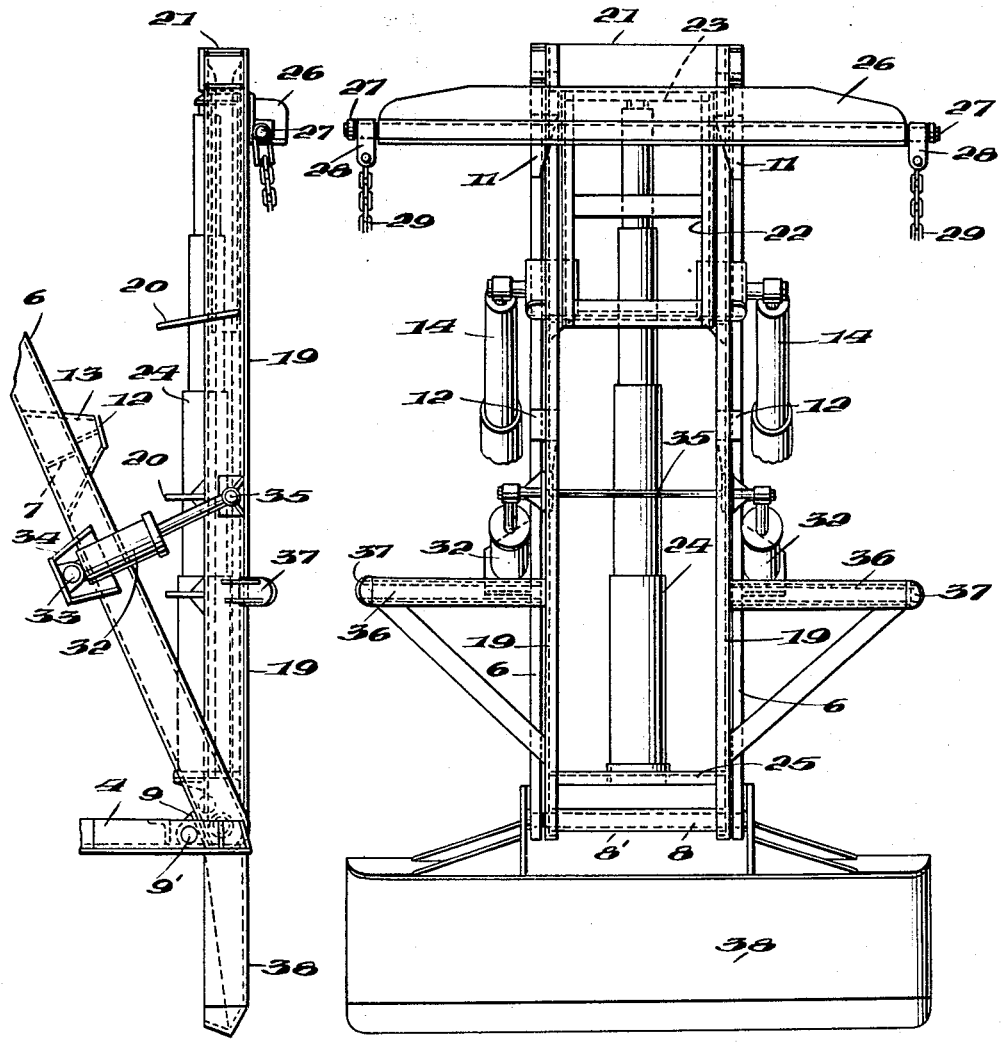

United States Patent Office 2,963,185
Patented Dec. 6, 1960

2,963,185

TRANSPORTING EQUIPMENT

Harry W. Jones and George R. Dempster, Knoxville, Tenn.; said Jones assignor to Dempster Brothers, Inc., Knoxville, Tenn., a corporation of Tennessee Filed Feb. 2, 1956, Ser. No. 563,061

13 Claims. (Cl. 214—505)

This invention relates to improvements in transporting equipment especially of the type for handling large or long containers and other objects adapted to be transported on a vehicle.

Transporting equipment of the character used heretofore has usually involved the raising of the container in an upright direction onto a carriage and the bodily movement of the container and carriage forward of the vehicle to a transport position thereon where the center of gravity of the container would be located over or forward of the axis of the rear wheels so as to stabilize the load on the vehicle.

Where the container is of extremely large area in horizontal direction, this would involve the necessity for movement of the container on the carriage to an extremely forward position not ordinarily available on most truck bodies, in order to be able to move the container forward sufficiently for stabilizing the load. If the container is extremely high, this would require a very long carriage and elevator assembly for lifting the container sufficiently to clear the inclined seat on the truck bed and it would also cause the container to project to an abnormally high elevation during transport of the vehicle along a highway, which may interfere with its clearance of overhead passages or obstacles therealong.

One object of this invention is to overcome these objections with unusually large or high containers and to improve the supporting of such containers or other like objects on the vehicle for transportation.

Another object of the invention is to provide for the tipping over of a container or other object to be transported onto a supported position on the container where its weight will be stabilized with respect to the vehicle to insure of proper operation and transportation thereof.

A further object of the invention is to improve the construction of transporting equipment to provide therein for lifting of a container even of abnormal size or height to a vehicle with a minimum of operations and by means of a very simplified structure.

These objects may be accomplished, according to one embodiment of the invention, by the provision of a carriage assembly which is pivotally mounted on a subframe adapted to be mounted on a vehicle, with an elevator assembly movably mounted on the carriage assembly capable of being raised and lowered with respect thereto. The elevator has provisions for connection with the container or other object to be lifted.

Also mounted on the subframe is an auxiliary subframe assembly adapted to be raised and lowered with respect thereto and capable of having the carriage assembly and elevator moved into a seated position thereon, so as to be lowered with the auxiliary subframe, to turn over the supported object, such as a container, into a prone position on the vehicle. Then, when it is desired to return the object to a discharge position, the auxiliary subframe will be raised first to its elevated position which is short of a vertical position, after which the carriage assembly and elevator will be moved with respect thereto to an upright position from which the container or other object may be discharged.

Due to the relative positions of these parts and the relative motion between the carriage and the auxiliary subframe, it is possible to use hydraulic power devices of the single-acting type for raising the auxiliary subframe, and to use double-acting cylinders only for raising and lowering the carriage assembly. Due to the relatively small motion of the latter with respect to the auxiliary subframe, the double-acting cylinders need be only relatively small. This materially simplifies the construction of the equipment, reduces the cost thereof, and yet provides for the transporting of unusual sizes of containers or other objects in stabilized positions on the vehicle.

This embodiment of the invention is illustrated in the accompanying drawings, in which:

Fig. 1 is a side elevation of the transporting unit, with the parts lowered;

Fig. 2 is a side elevation thereof, with the operating parts raised and connected with a container ready to be lifted;

Fig. 3 is a similar view, showing the container elevated;

Fig. 4 is a similar view, with the container partly lowered, the carriage being moved forward onto the auxiliary subframe;

Fig. 5 is a similar view, showing the equipment lowered to its transport position and the container prone with respect to the subframe;

Fig. 6 is a detail side elevation showing a stabilizing jack for the transporting unit, with parts omitted for clearness of illustration;

Fig. 7 is a view similar to Fig. 1, showing the stabilizing jack in greater detail, with the jack elevated;

Fig. 8 is a view similar to Fig. 3, with the jack lowered to stabilizing position;

Fig. 9 is a side elevation of the carriage and elevator assembly, detached;

Fig. 10 is a rear elevation thereof;

Fig. 11 is a detail plan view, partly in section, showing a portion of the subframe;

Fig. 12 is a detail cross section through the jack foot on the line 12—12 in Fig. 6; and Fig. 13 is a detail elevation showing a modified form of jack foot.

The invention is shown as applied to a motor vehicle or truck, generally indicated at 1, only the rear portion of which is illustrated in the drawings, but it will be appreciated that the invention may be applied to any suitable carriage or vehicle and to any desired part thereof on which transportation of a container or other object may be desirable. The carriage or vehicle should be of the self-propelled type and, as shown, tandem rear wheels are indicated at 2 supporting the rear end portion of a chassis frame 3. Steerable front wheels are usually provided, but the details of the vehicle, being conventional, need not be described in detail.

Mounted on the chassis frame 3 is a subassembly or frame, generally indicated at 4. This subassembly or frame is separate from the chassis frame, but securely attached thereto by suitable brackets, bolts or other fastening means, not illustrated in detail, although one of these is shown and indicated at 5. The subframe 4 usually comprises a pair of laterally spaced frame members seated upon and secured to the opposite side members of the chassis frame.

An auxiliary subframe assembly is indicated at 6 comprising a pair of oppositely spaced structural members connected together through suitable cross braces at intervals along the length thereof and at the upper end, as indicated in Fig. 9 at 7. The lower ends of the side members of the auxiliary subframe are connected together through a cross shaft 8. These side members of the auxiliary subframe 6 are provided with brackets 9 on the back faces thereof, pivotally connected at 9' to plates on the subframe 4, as shown in Fig. 11.

The auxiliary subframe 6 is provided also with a pair of seats 10 on the upper end thereof, formed on brackets 11 projecting outwardly from the frame members in positions to engage the carriage assembly when the latter is lowered onto the auxiliary subframe. Like seats are shown at 12 intermediate the length of the auxiliary subframe and mounted on brackets 13. The brackets 11 and 13 preferably extend outward from each of the side members of the auxiliary subframe, and the seats 10 and 12 are formed in the illustrated embodiment by plates attached to the respective brackets and projecting laterally inwardly therefrom sufficiently so as to be engaged by the side members of the carriage assembly, as hereinafter described, and thereby to support the carriage assembly on the auxiliary subframe.

The auxiliary subframe 6 is adapted to be raised and lowered by suitable hoisting means such, for example, as hydraulic cylinders, indicated generally at 14. These cylinders may be of the single-acting telescoped type, well known in the art, and connected at their upper ends by pivots 15, with brackets 16 secured to the side members of the auxiliary subframe. The lower ends of the cylinders 14 are pivotally connected at 17 to mounting brackets 18 that are mounted on the corresponding sides of the chassis frame 3, or they may be mounted directly on the subframe 4, if desired. The hydraulic control means for the cylinders 14, as well as the supply of fluid thereto, is not illustrated in detail, inasmuch as similar hydraulic means is well known in the art. The cylinders may be controlled by suitable means located in the cab of the vehicle.

The carriage assembly is indicated at 19, comprising a pair of opposite side members pivotally mounted at their lower ends on the cross shaft 8. A sleeve 8' extends between the lower ends of the side members 19 surrounding the pivot shaft 8 to journal the carriage on the latter.

This carriage assembly is thereby mounted for swinging movement on cross shaft 8 with the auxiliary subframe 6, as well as about the pivots 9 on which these parts are mounted on the subframe 4 for joint swinging movement with respect thereto.

The spaced members of the carriage 19 are braced at suitable points along the length thereof, as indicated at 20, and by a head member 21 at the upper ends of the side members.

The side members of the carriage 19 are formed with trackways on the inner faces thereof, slidably receiving therein an elevator assembly, generally indicated at 22. This elevator assembly is capable of raising and lowering movements with respect to the carriage and is guided therein for such movement, for raising and lowering the container. The carriage 22 has a head plate 23 secured thereto, with which is connected the piston rod end of a hydraulic cylinder 24. This hydraulic cylinder 24 is preferably of the telescoping cylinder type and is seated at its lower end on a step plate 25 extending between and secured to the side members of the carriage 19. A single-acting hydraulic cylinder will be sufficient for this purpose.

Also connected with the elevator 22 is a cross arm 26 carried by the elevator and projecting outwardly on opposite sides of the elevating mechanism sufficiently for connection with a container. Pins 27 on opposite ends of the cross arm 26 support saddles 28 from which are suspended flexible devices, such as chains 29, for supporting a container. The lower ends of the chains 29 carry plates 30 that are adapted for detachable engagement with lifting pins 31 on opposite sides of a container, generally indicated at C.

The carriage 19 may be moved to an upright position by hydraulic power devices, indicated generally at 32. These are of the double-acting type, each having a cylinder and piston therein. The cylinder is connected by a pivot 33 with a bracket 34 on each side of the auxiliary subframe 6. The piston rod of the hydraulic power device 32 extends to a pivot pin 35 projecting outward from each of the side members of the carriage 19.

The hydraulic system for supplying fluid to the several hydraulic power devices is not illustrated in detail, being well understood in the art, it being sufficient to indicate that the controls therefor usually provided are preferably located in the cab of the truck in the conventional manner.

Where the container is extremely wide or of large area, it is preferred that container guides be provided on opposite sides of the carriage 19, as indicated at 36 in Fig. 10, which guides are formed by bars extending outwardly from the side members against which the container can rest when drawn up on the carriage in the positions illustrated in Figs. 3, 4 and 5. The outer ends of the stabilizer members 36 are provided with arms 37 to prevent side sway of the container to an appreciable extent during transportation or while the container is being loaded.

It is preferred that an apron 38 be provided at the lower end of the carriage 19 preferably by a plate extending transversely, as shown in Fig. 10, and supported by the subframe 4 through suitable connections and braces therefor.

The unit is shown in Fig. 1 in closed position for highway travel with no load thereon. In Fig. 2, it is shown preparatory to pick-up of the container C. The telescoped cylinders 14 have raised the auxiliary subframe 6 to its usual position shown as at 45° to the horizontal. The double-acting cylinders 32, mounted on the auxiliary subframe 6, have moved the carriage 19 through an additional arc to its normal upright position. In the illustrated embodiment, this movement has extended through 20°, but is forward of the vertical, although directly in alignment with the sloping apron 38. The positions and degrees referred to are merely for purpose of example, although indicating the preferred relations of the parts, but may be changed as desired. The elevator 22 in this position has been lowered to permit attachment of the chains 29 to the lifting pins 31 on the container.

With the parts in this position as shown in Fig. 2, the operation of the hydraulic power device 24 moves the elevator 22 to an upright position where the cross arm 26 has been lifted to the position shown in Fig. 3, thereby raising the container C to its elevated position on the carriage 19. Where a wide container is being loaded, it may be stabilized on the elevator by the members 36 and 37.

Thereafter, the hydraulic hoists 32 are operated to swing the carriage 19 and the container C from the position shown in Fig. 3 to the position shown in Fig. 4. In this position the carriage 19 will be lowered onto the rests 10 and 12 on the auxiliary subframe 6.

The auxiliary subframe 6 is maintained in its elevated position by hydraulic pressure in the telescoped cylinders 14. As soon as such pressure is released in the line to the cylinders, the weight of the container and of the auxiliary subframe will cause the latter to be lowered to its seated position on the subframe 4, as shown in Fig. 5. This locates the container in its prone position for transportation, and it will be held in this position by the chains 29 which are maintained under tension, if desired, and by the stabilizing members 36 and 37 as the container is transported to the desired point for discharge. It will be noted in the position shown in Fig. 5, that the center of gravity of the container is forward of the rear axle for ideal load distribution. At the same time, the overhead clearance has been held at a minimum, which is especially important with extremely long or large area containers.

It will usually be found necessary or desirable, especially when loading heavy containers, to use stabilizing jacks under the carriage, as indicated generally at 39 in Figs. 1 to 5. While many forms of stabilizing jacks are known in the art and have been used for supporting the vehicle at the point of loading, a particular structure is shown in Figs. 6 to 8, which is preferably used for this purpose.

In this form of stabilizing jack, a shaft 40 is slidably mounted through a guide tube 41, secured by a bracket 42 on the rear face of the apron 38. The lower end of the shaft 40 carries a foot member 43 having a formed socket therein, as illustrated in Fig. 12, to embrace a ball 44 on the lower end of the shaft 40. This provides a universal connection between the foot member 43 and the shaft 40 which will enable the former to accommodate itself readily to irregularities in the surface or to various slopes thereof. The upper end of the shaft 40 is connected with one end of a lever 45 pivotally mounted at 46 intermediate the ends thereof upon a fulcrum bracket 47 which is suspended from the under side of the subframe 4. The opposite end of the lever 45 is connected by a link 48 with the auxiliary subframe 6 by means of a bracket 49 thereon, as shown in Figs. 7 and 8.

It will be apparent that the stabilizing jack, which is mounted at each opposite side of the conveying device, may be moved into and out of supporting position automatically by the raising and lowering of the auxiliary subframe 6. As the latter swings from the position shown in Fig. 7 to the position shown in Fig. 8, the upward swinging movement of the respective side members of the auxiliary subframe will cause an upward pull on the link 48, thereby swinging the lever 45 on its fulcrum 46 and pushing downward on the shaft 40, sliding the foot 43 into engagement with the ground or other surface. Then, upon lowering of the auxiliary subframe again, the stabilizing jacks will be raised automatically.

If the unit is to be operated on pavement or other hard surface only, it may be desirable to provide rollers on the foot member 43, as indicated at 50 in Fig. 13. These rollers are journaled on pins 51 extending in opposite directions from the foot member and should be oriented for travel of the rollers in a direction lengthwise of the vehicle.

In the embodiment of the invention illustrated in the drawings, the carriage 19 is located at an elevation of approximately 10° to the horizontal, when the parts are in the relation shown in Fig. 1. However, when the hoisting unit is backed up to a container or other article to be transported and the parts raised to the position shown in Fig. 2, the carriage 19 is inclined at approximately 20° to the vertical. Thus, when the chains 29 are attached to the container C, the container will be pulled over to approximately 20°, as shown in Fig. 3.

After thus lifting the container, the carriage 19 is lowered onto the rests 10 and 12 to the position indicated in Fig. 4, by operation of the hydraulic power devices 32. During this action, the center of gravity of the container has been moved over past the vertical plane through the transverse axis 9' on which the auxiliary subframe 6 and the carriage 19 are mounted on the subframe 4. Then, upon collapse of the single-acting long cylinders 14, the hoisting unit is lowered to its carrying position illustrated in Fig. 5.

In this way the auxiliary subframe 6 makes it possible to move the large or high container or other article to be transported over beyond the center of gravity of the latter by means of double-acting hydraulic cylinders. These need be only relatively small, in order to accomplish this result, without requiring double-acting cylinders for the longer cylinders needed to move the carriage to its upright position from its carrying position. Nevertheless full control is maintained at all times, both when moving it onto the auxiliary subframe and when lowering it by gravity to its transport position.

While the invention has been illustrated and described in certain embodiments, it is recognized that variations and changes may be made therein without departing from the invention as set forth in the claims.

We claim:

1. In transporting equipment, the combination of a subframe adapted to be mounted on a vehicle, a tiltable carriage, means on the carriage for supporting an article thereon, an auxiliary subframe, means mounting the carriage and the auxiliary subframe for swinging, raising and lowering movements about axes located at one end of the vehicle and with respect to the first-mentioned subframe, and means for lowering the carriage onto the auxiliary subframe while the latter is in a raised position.

2. In transporting equipment, the combination of a subframe adapted to be mounted on a vehicle, a tiltable carriage, means on the carriage for supoprting an article thereon, an auxiliary subframe, means pivotally mounting the auxiliary subframe for swinging movement about an axis located at the rear end of the vehicle to raised and lowered positions with respect to the first-mentioned subframe, means pivotally mounting the carriage for raising and lowering movements with respect to the auxiliary subframe and for lowering movement onto the auxiliary subframe while the latter is in a raised position.

3. In transporting equipment, the combination of a subframe adapted to be mounted on a vehicle, a tiltable carriage, means on the carriage for supporting an article thereon, an auxiliary subframe, means pivotally mounting the auxiliary subframe for swinging movement about an axis at the rear end of the vehicle to raised and lowered positions with respect to the first-mentioned subframe, means pivotally mounting the carriage for raising and lowering movements about an axis at the rear end of the vehicle with respect to the auxiliary subframe and for lowering movement onto the auxiliary subframe while the latter is in a raised position, and power devices operatively connected with the carriage for moving said carriage to positions appreciably on opposite sides of a vertical transverse plane through the first-mentioned pivot means.

4. In transporting equipment, the combination of a subframe adapted to be mounted on a vehicle, a tiltable carriage, means on the carriage for supporting an article thereon, an auxiliary subframe, means pivotally mounting the auxiliary subframe at one end thereof on the first-mentioned subframe for swinging movement to raised and lowered positions with respect to the first-mentioned subframe, means pivotally connecting the carriage with the auxiliary subframe at the pivoted end thereof for swinging movement with respect thereto to an upright position for connection of the supporting means with an article and for raising movement of the article on the carriage, power operated means interconnecting the carriage with the auxiliary subframe for swinging movement of the carriage to a lowered position on the auxiliary subframe after support of the article thereon.

5. In transporting equipment, the combination of a subframe adapted to be mounted on a vehicle, an auxiliary subframe, means pivotally connecting the auxiliary subframe at one end thereof with the first-mentioned subframe for raising movement of the auxiliary subframe with respect thereto to an inclined position thereover, power means connected with the auxiliary subframe for causing said raising movement thereof and permitting lowering of the auxiliary subframe with respect thereto, a tiltable carriage having means for connection with an article and lifting said article to a supporting position on the carriage, and means pivotally mounting the tiltable carriage on the pivoted end of the auxiliary subframe for swinging movement to raised and lowered positions with respect thereto.

6. In transporting equipment, the combination of a subframe adapted to be mounted on a vehicle, an auxiliary subframe, means pivotally connecting the auxiliary subframe with the first-mentioned subframe adjacent one end of the vehicle for raising movement of the auxiliary subframe with respect thereto to an inclined position thereover, power means connected with the auxiliary subframe for causing said raising movement thereof and permitting lowering of the auxiliary subframe with respect thereto, a tiltable carriage having means for connection with an article and lifting said article to a supporting position on the carriage, and means pivotally mounting the tiltable carriage on the auxiliary subframe at the first-mentioned end of the vehicle for swinging movement to raised and lowered positions with respect thereto, and power means interconnecting the tiltable carriage with the auxiliary subframe for causing swinging movement thereof and to move the tiltable carriage relative to the auxiliary subframe sufficiently to move the center of gravity of the article past a vertical transverse plane through the axis of the pivotal mounting means for the carriage.

7. In transporting equipment, the combination of a subframe adapted to be mounted on a vehicle, an auxiliary subframe, means pivotally connecting the auxiliary subframe with the first-mentioned subframe adjacent one end of the vehicle for raising movement of the auxiliary subframe with respect thereto to an inclined position thereover, power means connected with the auxiliary subframe for causing said raising movement thereof and permitting lowering of the auxiliary subframe with respect thereto, a tiltable carriage having means for connection with an article and lifting said article to a supporting position on the carriage, means pivotally mounting the tiltable carriage on the auxiliary subframe at the first-mentioned end of the vehicle for swinging movement to raised and lowered positions with respect thereto, power means interconnecting the tiltable carriage with the auxiliary subframe for causing swinging movement thereof and to move the tiltable carriage relative to the auxiliary subframe sufficiently to move the center of gravity of the article past a vertical transverse plane through the axis of the pivotal mounting means for the carriage, and single-acting hydraulic power devices connected with the auxiliary subframe for raising the latter with respect to the first-mentioned subframe to said inclined position and permitting lowering thereof by gravity.

8. In transporting equipment, the combination of a subframe adapted to be mounted on a vehicle, an auxiliary subframe extending over the first-mentioned subframe, means pivotally mounting the auxiliary subframe at one end on the first-mentioned subframe for swinging movement of the auxiliary subframe to an inclined position with respect thereto, single-acting hydraulic power devices connected with the auxiliary subframe for raising the latter to said inclined position and permitting lowering movement thereof by gravity, a tiltable carriage extending over the auxiliary subframe, means on the carriage for connection with an article to lift the article to a supported position on the carriage, means pivotally mounting the carriage at one end on the pivoted end portion of the auxiliary subframe for swinging movement with respect thereto to an elevated position spaced above the raised position of the auxiliary subframe and for lowering movement onto the latter and therewith onto the first-mentioned subframe, double-acting hydraulic power devices interconnecting the auxiliary subframe with the carriage for moving the carriage about the pivotal mounting means thereof with respect to the auxiliary subframe, and supports mounted on the auxiliary subframe in positions for seating engagement with the carriage when the latter is lowered with respect thereto.

9. In transporting equipment, the combination of a subframe adapted to be mounted on a vehicle, a tiltable carriage, means on the carriage for supporting an article thereon, an auxiliary subframe, means mounting the auxiliary subframe for raising and lowering movements with respect to the first-mentioned subframe, means for lowering the carriage on the auxiliary subframe while the latter is in a raised position, and power jacks near the rear of the vehicle mounted on the subframe on which the auxiliary subframe and the carriage are mounted in positions to be lowered into engagement with the ground upon raising movement of the auxiliary subframe and carriage with respect to the first-mentioned subframe, each of the jacks including a foot member and link means operatively connected with the auxiliary subframe and with the foot member for moving the foot member into engagement with the ground in response to raising movement of the auxiliary subframe relative to the first-mentioned subframe.

10. In transporting equipment, the combination with a vehicle chassis, of a subframe extending lengthwise of the chassis and mounted thereon, an auxiliary subframe, means pivotally mounting the auxiliary subframe at one end on the first-mentioned subframe substantially at the rear end of the vehicle chassis for swinging movement upwardly and downwardly relative thereto, a carriage over the auxiliary subframe, means pivotally mounting the carriage at one end on the first-mentioned subframe substantially at the rear end of the vehicle chassis.

11. In transporting equipment, the combination with a vehicle chassis, of a subframe extending lengthwise of the chassis and mounted thereon, an auxiliary subframe, means pivotally mounting the auxiliary subframe at one end to the first-mentioned subframe substantially at the rear end of the vehicle chassis for swinging movement upwardly and downwardly relative thereto, a carriage over the auxiliary subframe, means pivotally mounting the carriage at one end to the first-mentioned subframe coaxially with the mounting of the auxiliary subframe thereon, and means on the carriage for supporting a device thereon.

12. In transporting equipment, the combination with a vehicle chassis, of a subframe extending lengthwise of the chassis and mounted thereon, an auxiliary subframe overlying the first-mentioned subframe, a carriage overlying the auxiliary subframe, means on the carriage for supporting a device thereon, and means pivotally connecting the auxiliary subframe and the carriage with the first-mentioned subframe on axes located adjacent the rear end of the vehicle chassis and offset from both the auxiliary subframe and the carriage.

13. In transporting equipment, the combination of a subframe adapted to be mounted on a vehicle, a titltable carriage, means on the carriage for supporting an article thereon, means for raising and lowering the carriage on the subframe, and power jacks near the rear of the vehicle mounted on the subframe in positions to be lowered into engagement with the ground upon raising movement of the carriage with respect to the subframe, brackets mounted on the vehicle, each of the jacks including an upwardly extending shaft slidable in the bracket and a foot member connected to the lower end of the shaft, and link means operatively connected with the carriage and with the upper end of the shaft for moving the foot member into engagement with the ground in response to raising movement of the carriage relative to the subframe.

References Cited in the file of this patent

UNITED STATES PATENTS

| 1,985,169 | Howell et al. | Dec. 18, 1934 |
| 2,264,216 | Milligan | Nov. 25, 1941 |
| 2,274,895 | Haniquet | Mar. 3, 1942 |
| 2,439,085 | Grzech | Apr. 6, 1948 |
| 2,606,676 | Dempster | Aug. 12, 1952 |
| 2,621,811 | Lull | Dec. 16, 1952 |
| 2,646,250 | Fuster | July 21, 1953 |
| 2,681,790 | Taber | June 22, 1954 |
| 2,724,522 | Phebus | Nov. 22, 1955 |

FOREIGN PATENTS

| 696,609 | France | Oct. 14, 1930 |
| 536,878 | Germany | Oct. 28, 1931 |